(12) United States Patent
Cho et al.

(10) Patent No.: US 11,224,321 B2
(45) Date of Patent: Jan. 18, 2022

(54) DUST COLLECTING APPARATUS AND CLEANER HAVING THE SAME

(71) Applicant: SAMSUNG ELECTRONICS CO., LTD., Suwon-si (KR)

(72) Inventors: Youngjun Cho, Suwon-si (KR); Byeongwoo Ahn, Suwon-si (KR); Jonggook Lim, Suwon-si (KR)

(73) Assignee: SAMSUNG ELECTRONICS CO., LTD, Suwon-si (KR)

(*) Notice: Subject to any disclaimer, the term of this patent is extended or adjusted under 35 U.S.C. 154(b) by 407 days.

(21) Appl. No.: 16/514,498

(22) Filed: Jul. 17, 2019

(65) Prior Publication Data
US 2020/0069128 A1 Mar. 5, 2020

(30) Foreign Application Priority Data

Aug. 30, 2018 (KR) .......................... 10-2018-0102594

(51) Int. Cl.
A47L 9/16 (2006.01)
A47L 5/36 (2006.01)
B01D 46/00 (2006.01)

(52) U.S. Cl.
CPC ............... *A47L 9/1633* (2013.01); *A47L 5/36* (2013.01); *A47L 9/1683* (2013.01); *B01D 46/0056* (2013.01); *B01D 2279/55* (2013.01)

(58) Field of Classification Search
CPC .......... A47L 5/36; A47L 9/106; A47L 9/1633; A47L 9/1683; A47L 9/1691; B01D 2279/55; B01D 46/0056
See application file for complete search history.

(56) References Cited

U.S. PATENT DOCUMENTS 5,090,976 A * 2/1992 Dyson ................... A47L 9/1418
55/337
6,521,006 B2 * 2/2003 Park ................... B01D 46/2411
55/337

(Continued)

FOREIGN PATENT DOCUMENTS

CN 207627254 7/2018
EP 1958562 8/2008

(Continued)

OTHER PUBLICATIONS

Extended European Search Report dated Feb. 17, 2020 in European Patent Application No. 19183805.1.

(Continued)

*Primary Examiner* — Marc Carlson
(74) *Attorney, Agent, or Firm* — Staas & Halsey LLP (57) ABSTRACT

A dust collecting apparatus is provided. The dust collecting apparatus according to an embodiment includes a dust collecting case including a dust outlet to discharge collected dust, a cyclone member configured to rotate and move linearly in the dust collecting case to be detachable from and attachable to the dust collecting case, a discharge cover configured to rotate and move linearly together with the cyclone member, and detachable from and attachable to an upper part of the dust collecting case to open and close the dust outlet, and a sealing member having elasticity disposed between the dust collecting case and the discharge cover. The discharge cover rotates along a horizontal direction of the dust collecting case to detach from the upper part of the dust collecting case and form a space between the sealing member and the dust collecting case.

15 Claims, 9 Drawing Sheets

(56) References Cited

U.S. PATENT DOCUMENTS

| | | | | |
|---|---|---|---|---|
| 7,380,308 B2* | 6/2008 | Oh | ............... | A47L 9/1481 |
| | | | | 15/327.2 |
| 2007/0226949 A1* | 10/2007 | Hahm | ............... | A47L 9/106 |
| | | | | 15/340.1 |
| 2014/0208539 A1* | 7/2014 | Ashbee | ............... | A47L 9/1633 |
| | | | | 15/347 |
| 2017/0332860 A1* | 11/2017 | Nam | ............... | A47L 9/22 |
| 2018/0213989 A1* | 8/2018 | Cho | ............... | A47L 9/1625 |
| 2019/0091703 A1* | 3/2019 | Hyun | ............... | B04C 5/04 |

FOREIGN PATENT DOCUMENTS

| | | |
|---|---|---|
| EP | 2 708 172 | 3/2014 |
| JP | 3809607 | 8/2006 |
| JP | 5737391 | 6/2015 |
| KR | 10-0406638 | 11/2003 |
| KR | 10-0651291 | 11/2006 |
| KR | 10-1309796 | 9/2013 |
| KR | 10-1759849 | 7/2017 |

OTHER PUBLICATIONS

Korean Office Action dated May 31, 2019 in corresponding Korean Patent Application No. 10-2018-0102594.

* cited by examiner

DUST COLLECTING APPARATUS AND CLEANER HAVING THE SAME

CROSS-REFERENCE TO RELATED APPLICATIONS

This application claims priority from Korean Patent Application No. 10-2018-0102594, filed on Aug. 30, 2018, in the Korean Intellectual Property Office, the disclosure of which is incorporated herein by reference in its entirety.

BACKGROUND

1. Field

The devices and methods disclosed herein relate to a dust collecting apparatus, and more particularly, to a dust collecting apparatus that is easily closed and opened and a cleaner having the same.

2. Description of the Related Art

Generally, a cleaner inhales air including dirt on a cleaning surface, separates the dirt from the air to collect, and discharge purified air to the outside of the cleaner body.

The cleaner also includes a dust collecting apparatus capable of separating dust from the inhaled air to collect and discharge the purified air to the outside.

One type of the dust collecting apparatus, a cyclone dust collecting apparatus, is an apparatus for separating dust in the inhaled air using centrifugal force. The cyclone dust collecting apparatus has been widely used because it can be used semi-permanently, and is more hygienic and convenient to use compared to a dust bag type dust collecting apparatus.

The cyclone dust collecting apparatus be configured such that one side is to be opened and closed for discharging the separated dust to the outside. The area to be opened and closed may be sealed to maintain the suction force in the dust collecting apparatus and prevent the dust from flowing out to the outside.

If the sealing effect by a sealing member applied to the dust collecting apparatus is excellent, the suction force in the dust collecting apparatus is maintained, and the dust flows out to the outside less, but it is difficult to easily open and close the dust collecting apparatus. In addition, if the dust collecting apparatus is opened, dust collected in the dust collecting apparatus could be scattered or discharged to anywhere due to the pressure difference between the inside and the outside of the dust collecting apparatus.

SUMMARY

An aspect of the embodiments relates to providing a dust collecting apparatus having an improved structure for allowing easy opening and closing while maintaining an excellent sealing state against an external impact, and a cleaner having the same.

According to an embodiment, there is provided a dust collecting apparatus, including a dust collecting case including a dust outlet to discharge collected dust, a cyclone member configured to rotate and move linearly in the dust collecting case to be detachable from and attachable to the dust collecting case, a discharge cover configured to rotate and move linearly together with the cyclone member, to detach from and attach to an upper part of the dust collecting case to open and close the dust outlet, and a sealing member having elasticity and disposed between the dust collecting case and the discharge cover, wherein the discharge cover rotates along a horizontal direction of the dust collecting case to detach from the upper part of the dust collecting case and form a space between the sealing member and the dust collecting case.

The cyclone member may rotate with respect to the dust collecting case together with the discharge cover and move in a vertical direction rotates in the horizontal direction of the dust collecting case.

The dust collecting case and the discharge cover may be locked to each other not to separate the cyclone member based on the cyclone member moving down due to a downward rotation of the discharge cover, wherein the dust collecting case and the discharge cover are unlocked to separate the cyclone member based on the cyclone member moving up due to an upward rotation of the discharge cover.

The apparatus may further include a guide member and a guide protrusion to couple the cyclone member to the dust collecting case by rotation inside the dust collecting case, wherein the guide member protrudes from a bottom surface of the dust collecting case, and wherein the guide protrusion is formed at a bottom of the cyclone member to be mounted on the guide member.

The guide member may include a guide groove including an inclination part downwardly inclined from an upper end of the guide member, and a trapping part downwardly concaved from the inclination part.

The discharge cover may be locked to the dust collecting case based on the guide protrusion being mounted on the trapping part, and unlocked from the dust collecting case based on the guide protrusion rotating along the inclination part.

The inclination part may be symmetrically formed with respect to the trapping part.

The cyclone member may further include a dust separation member including an inner space, and into which the guide member is inserted.

The guide protrusion may protrude from an inner side surface of the inner space of the dust separation member.

The dust collecting case may include an outer wall contacting the sealing member, wherein an upper part of the outer wall includes an inclination wall inclined outwardly from the outer wall of the dust collecting case.

The discharge cover may include a first fixing member to fix the discharge cover to be coupled to the dust collecting case on one side, wherein the dust collecting case includes a second fixing member in a position corresponding to the first fixing member.

According to an embodiment, there is provided a cleaner including a suction nozzle, a dust collecting apparatus connected to the suction nozzle, and a suction motor connected to the dust collecting apparatus to generate a suction force, wherein the dust collecting apparatus includes a dust collecting case including a dust outlet to discharge collected dust, a cyclone member configured to rotate and move linearly in the dust collecting case to be detachable from and attachable to the dust collecting case, a discharge cover configured to rotate and move linearly with the cyclone member, to detach from and attach to an upper part of the dust collecting case to open and close the dust outlet, and a sealing member having elasticity and disposed between the dust collecting case and the discharge cover, wherein the discharge cover rotates along a horizontal direction of the dust collecting case to detach from the upper part of the dust collecting case and form a space between the sealing member and the dust collecting case.

The cyclone member may rotate with respect to the dust collecting case together with the discharge cover and move in a vertical direction in line with a horizontal rotation operation of the discharge cover.

The dust collecting case and the discharge cover may be locked to each other not to separate the cyclone member based on the cyclone member moving down due to a downward rotation of the discharge cover, wherein the dust collecting case and the discharge cover are unlocked to separate the cyclone member based on the cyclone member moving up due to an upward rotation of the discharge cover.

The cleaner may be a wireless stick cleaner or a robot cleaner.

According to the above-described various embodiments, a dust collecting apparatus may allow easy opening and closing, and dust can be prevented from being scattered by the opening and closing of the dust collecting apparatus.

Additional aspects will be set forth in part in the description which follows and, in part, will be apparent from the description, or may be learned by practice of the presented embodiments

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EXEMPLARY EMBODIMENTS

Hereinafter, a display apparatus and a method for providing a channel list using the same according to an embodiment will be described in detail with reference to the drawings attached hereto.

The disclosure is not limited to an embodiment disclosed below and may be implemented in various forms and the scope of the disclosure is not limited to the following embodiments. In addition, all changes or modifications derived from the meaning and scope of the claims and their equivalents should be construed as being included within the scope of the disclosure. In the following description, the configuration which is publicly known but irrelevant to the gist of the disclosure could be omitted. In addition, the attached drawings are not drawn to scale to facilitate understanding of the disclosure, but the dimensions of some of the components may be exaggerated.

The terms such as "first," "second." and so on may be used to describe a variety of elements, but the elements should not be limited by these terms. The terms are used simply to distinguish one element from other elements. The use of such ordinal numbers should not be construed as limiting the meaning of the term. For example, without departing from the scope of the disclosure, the first component may be referred to as a second component, and similarly, the second component may also be referred to as a first component.

Unless otherwise defined, all terms (including technical and scientific terms) used herein have the same meaning as commonly understood by one of ordinary skill in the art to which this disclosure belongs.

It should be noted that terms such as "front end", "rear end", "upper end", "lower end", "upper end", "lower end", etc. used in the disclosure are defined with reference to drawings, but the shape and the location of each constituent element are not limited by the terms.

The disclosure relates to a dust collecting apparatus mounted in a cleaner for separating dust and dirt from air containing dust and dust (hereinafter referred to as dust-containing air) sucked by a suction force generated by a suction motor, and discharging purified air to the outside.

Figure 1:
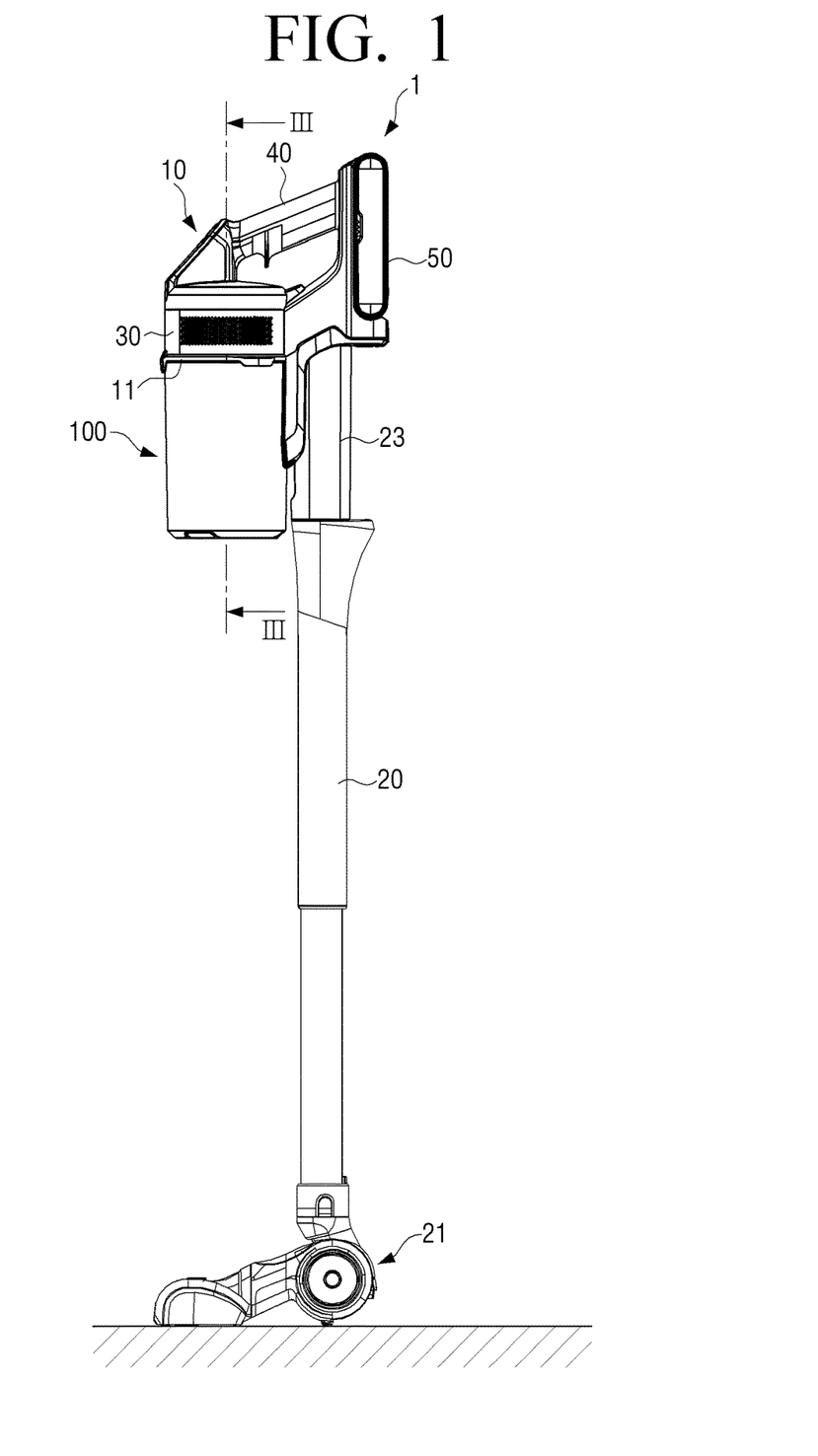
FIG. 1 is a side view illustrating a cleaner according to an embodiment.

FIG. 1 is a side view illustrating a cleaner according to an embodiment.

Referring to FIG. 1, a cleaner 1 may include a body 10, a dust collecting apparatus 100, and a suction nozzle 21.

The body 10 may include a suction motor 30 for generating a suction force, a holder 40 for grabbing the cleaner 1, a battery 50 for providing power to the suction motor, and a connection part 23 to which an extension pipe 20 is connected.

The air from which dirt and dust are removed passing through the dust collecting apparatus 100 may pass through the suction motor 30 to be discharged to the outside of the cleaner 1.

The holder 40 may be mounted on the upper portion of the cleaner 1 to be grabbed by a user for operating the cleaner 1. A switch (not shown) for turning on/off a power of the cleaner 1 may be provided on the holder 40.

The battery 50 may be a charge battery for charging the cleaner 1 by using an external power source.

One end of the connection part 23 may be formed to attach and detach the extension pipe 20. The other end of the connection part 23 may be formed to be connected to an inlet 111 (see FIG. 2) of a first cyclone 121 (see FIG. 3) of the multi cyclone dust collecting apparatus 100.

One end of the extension pipe 20 may be connected to the connection part 23 of the body 10, and the other end of the extension pipe 20 may include a suction nozzle 1 for suctioning dirt while moving along the cleaning surface.

When power of the cleaner 1 is turned on, the suction motor 30 may rotate to generate a suction force. When the suction force is generated, dust containing air including dirt and dust of the cleaning surface may flow into the extension pipe 20 through the suction nozzle 21.

A mounting part 11 for mounting the dust collecting apparatus 100 may be provided on the body 10. The dust collecting apparatus 100 may be detachably mounted on the mounting part 11.

Figure 2:
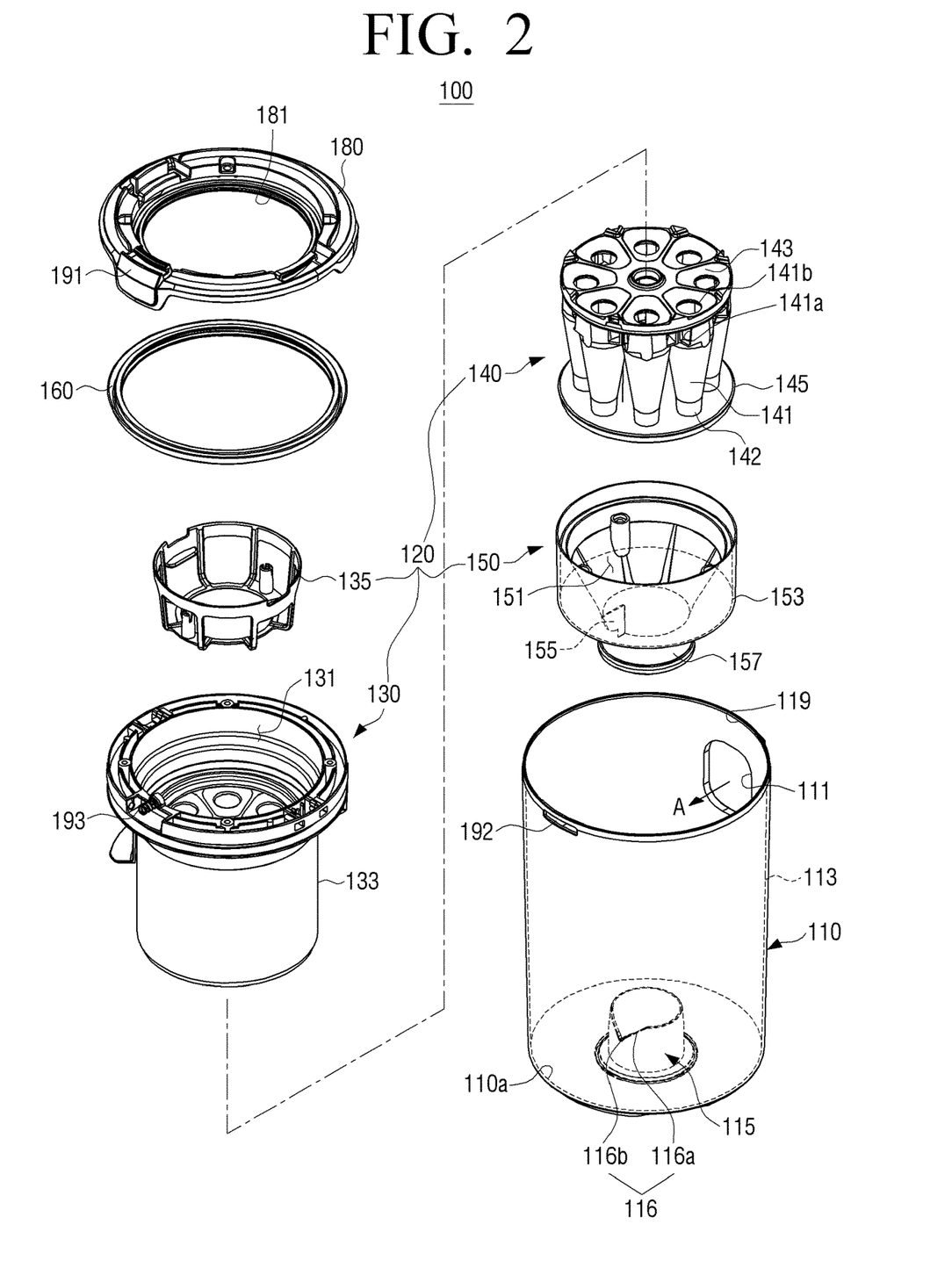
FIG. 2 is an exploded perspective view illustrating a dust collecting apparatus according to an embodiment.

The dust collecting apparatus 100 may separate dust from the inhaled air through the suction nozzle 21 to collect and allow the purified air to flow toward the suction motor 30 through an outlet 181 (see FIG. 2).

The dust collecting apparatus 100 may centrifuge dust from the air. In other words, the dust collecting apparatus 100 may separate dust from air by generating a swirling air current. When dust is accumulated to a certain amount in the dust collecting apparatus 100, a user may separate the dust collecting apparatus 100 from the body 10 to throw away the dust in the dust collecting apparatus 100 to the outside.

FIG. 2 is an exploded perspective view illustrating a dust collecting apparatus according to an embodiment.

Figure 3:
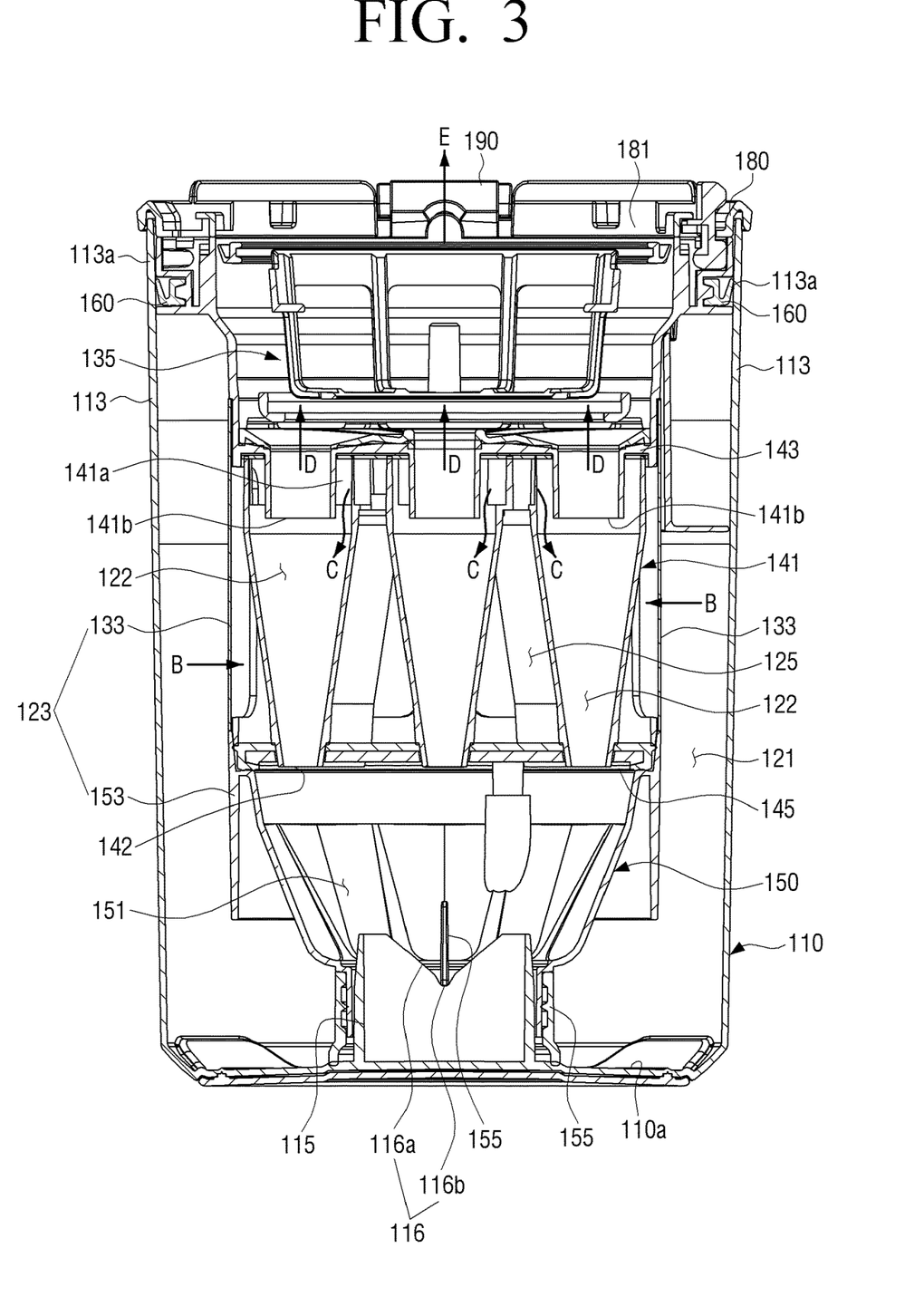
FIG. 3 is a cross-sectional view taken along line III-III illustrating a dust collecting apparatus shown in FIG. 1.

Referring to FIG. 2, and FIG. 3, a dust collecting apparatus 100 according to an embodiment may include a dust collecting case 110, a cyclone member 120, a discharge cover 180, and a sealing member 160.

An inlet 111 and an outlet 181 may be provided in the dust collecting apparatus 100. The air suctioned from the suction nozzle 21 may flow into the inside of the dust collecting apparatus 100 through the inlet 111 and may be separated from dust in the dust collecting apparatus 100. The dust free air may be discharged to the body 10 through the outlet 181. To be specific, air discharged from the collecting case 110 through the outlet 181 may move to the suction motor 30.

The dust collecting apparatus 100 may include a first cyclone 121 and a plurality of second cyclones 122. The first cyclone 121 and the second cyclones 122 may be formed by the cyclone member 120 and the dust collecting case 110.

The first cyclone 121 may separate large size dirt and dust from the inhaled dust containing air by using a centrifugal force. The air separated from the dirt and dust from the first cyclone 121 may be discharged from the first cyclone 121 toward the plurality of second cyclones 122.

The first cyclone 121 may include of the dust collecting case 110 forming the appearance of the dust collecting apparatus 100 and the cyclone member 120 mounted inside the dust collecting case 110.

The dust collecting case 110 may be formed in a hollow cylindrical shape, and include a bottom 110a on its one side. In other words, the dust collecting case 110 may be formed in a vessel shape having the bottom 110a.

The cyclone member 120 may be provided in the dust collecting case 110. The cyclone member 120 may rotate and move linearly in an up-and-down direction in the dust collecting case 110 to be detached from the dust collecting case 110. The cyclone member 120 may generate a swirling air current to separate dirt from air by a centrifugal force.

The cyclone member 120 may include a filter member 135, a middle case 130, a cyclone body 140, and a dust separation member 150.

The middle case 130 may include the filter member 135 on its upper side, the cyclone body 140 on its inner side, and the dust separation member 150 on its lower side. The middle case 130, the filter member 135, the cyclone body 140 and the dust separation member 150 may be combined and provided in the dust collecting case 110.

The cyclone member 120 may be positioned in the dust collecting case 110 to rotate about the dust collecting case 110 and move in a vertical direction.

The middle case 130 may include of an upper space 131 on which the filter member 135 is mounted on its upper side, and a porous member 133 surrounding the space in which the cyclone body 140 is disposed inside.

The dust separation member 150 may include of a dust collecting room 151 in which dust collected inside, and a middle wall 153 for surrounding the dust collecting room 151.

An outer wall 123 of the cyclone member 120, which is formed by coupling the middle case 130 to the dust separation member 150 may be formed in a hollow cylindrical shape, and mounted concentrically with the dust collecting case 110 inside the dust collecting case 110. The outer wall 123 may be spaced apart from the side wall of the dust collecting case 110 at a predetermined distance, and thus a space may be formed between the outer wall 123 and the dust collecting case 110. The dirt containing air that flows into the inlet 111 of the dust collecting case 110 may swirl around the space between the outer wall 123 and the side wall of the dust collecting case 110.

The outer surface of the middle case 130 may be formed of the porous member 133. The porous member 133 may be formed as a grill, a filter, or the like, in which a plurality of holes are provided so as to allow air to pass therethrough and not to allow large sized dirt and dust to pass therethrough.

The porous member 133 may serve as an outlet through which dirt and dust free air is discharged from the first cyclone 121. Therefore, the inner space of the middle case 130 could be a middle chamber 125 in which air discharged from the first cyclone 121 through the porous member 133 is collected.

The cyclone body 140 may be mounted inside the middle case 130. The cyclone body 140 may include of a plurality of cyclones 141 in which the second cyclones 122 is formed inside.

The plurality of second cyclones 122 may be mounted inside the porous member 133. Therefore, the porous member 133 may separate the plurality of second cyclones 122 and the dust collecting case 110.

The plurality of second cyclones 122 may separate fine dust from the air discharged from the first cyclone 121. The large sized dirt and dust discharged from the first cyclone 121 may be collected at the bottom 110a of the dust collecting case 110, and the air discharged from the first cyclone 121 may only contain fine dust without large sized dirt and dust.

The plurality of cyclones 141 may be arranged in a circle shape. The arrangement and number of the second cyclones 122 are only exemplary, and the second cyclones 122 may be disposed in various numbers and forms.

Each of the plurality of second cyclones 122 may include an air inlets 141a and an air outlet 141b.

A bottom plate 145 blocking the upper part of the dust separation member 150 may be mounted at the bottom of the plurality of second cyclones 122. The bottom plate 145 may be mounted at the bottom of the cyclone body 140 and the upper part of the dust separation member 150, and separate the dust collecting room 151 of the dust separation member 150 provided under the plurality of second cyclones 122 and the middle chamber 125 in which the plurality of second cyclones 122 are mounted. A plurality of holes into which dust outlets 142 at the bottom of the plurality of second cyclones 122 are inserted may be formed on the bottom plate 145.

The dust separation member 150 may be coupled to the bottom of the middle case 130. The dust collecting room 151 of the dust separation member 150 may be provided under the plurality of second cyclones 122 to collect the fine dust separated from the plurality of second cyclones 122.

The dust collecting room 151 may be surrounded by the middle wall 153 extending downward beyond the bottom plate 145 by a predetermined length.

The bottom of the dust collecting room 151 may be opened, and the dust discharge pipe 157 for discharging fine dust separated from the second cyclones 122 may be formed under the dust collecting room 151. The opened bottom of the dust collecting room 151 may be connected to the dust collecting case 110 by the dust discharge pipe 157.

To be specific, the dust collecting room 151 and the dust collecting case 110 may be connected because the guide member 115 extending upward from the center of the bottom 110a of the dust collecting case 110 is inserted into the inside of the dust discharge pipe 157.

The dust collecting apparatus 100 may include a guide member 115 for rotatably coupling the cyclone member 120 to the dust collecting case 110 and a guide protrusion 155.

The guide protrusion 155 may be formed on the inner wall of the dust collecting room 151. The guide protrusion 155 may protrude from the inner wall of the dust collecting room 151. The guide protrusion 155 may be coupled to the guide member 115, and move the cyclone member 120 by the guide member 115 upwardly and downwardly as the cyclone member 120 rotates based on a central axis.

The guide member 115 may have a hollow cylindrical shape, and be formed to be inserted to the dust discharge pipe 157 of the dust separation member 150.

The guide groove 116 which is concave inwardly in a circumferential direction may be provided on the upper end of the guide member 115 so that the guide protrusion 155 may be inserted thereto. The guide member 115 may include at least one guide groove 116.

The guide groove 116 may include an inclination part 116a that is inclined downwardly from the upper end of the guide member 115 and extended in the circumferential direction and a trapping part 116b which is concave downwardly to the inclination part 116a.

The inclination part 116a may be inclined and extended along the circumferential direction from the trapping part 116b. The inclination part 116a may guide the movement of the guide protrusion 155, and guide the cyclone member 120 to rotate along the circumferential direction and move in a vertical direction.

The inclination part 116a may be inclined to move the combined cyclone member 120 to move in the vertical direction during the rotation of the discharge cover 180.

There is no limitation to the detailed shape of the inclination part 116a, and the angle (θ) and the shape of the inclination part 116a may be determined according to the distance variation amount in which the cyclone member 120 moves up by the rotation of the discharge cover 180.

The guide protrusion 155 may be inserted into the guide groove 116 to slide along the inclination part 116a to thereby move the position of the cyclone member 120.

The inclination part 116a may be formed symmetrically with respect to the trapping part 116b on both sides. Accordingly, it is possible to guide the guide protrusion 155 regardless of which direction the cyclone member 120 rotates either clockwise or counterclockwise It is illustrated that the inclination part 116a is formed with respect to the trapping part 116b on both sides, but is not limited thereto. The inclination part 116a may be formed with respect to the trapping part 116b on one side. In this case, the other end of the trapping part 116b may vertically extend so that the guide protrusion 155 may be mounted in the trapping part 116b.

The trapping part 116b may be formed such that the guide protrusion 155 may be mounted. The trapping part 116b may extend parallel to the circumferential direction from the inclination part 116a. The guide protrusion 155 may be inserted into the trapping part 116b to be fixed in the circumferential direction.

The discharge cover 180 may be locked to the dust collecting case 110 when the guide protrusion 155 is mounted on the trapping part 116b, and when the guide protrusion 155 is inserted into the guide groove 116 to rotate along the inclination part 116a, the discharge cover 180 may be unlocked from the dust collecting case 110.

The detailed locking and unlocking process of the discharge cover 180 and the cyclone member 120 by the guide member 115 and the guide protrusion 155 will be described below.

The outer circumference of the guide member 115 protruding from the bottom 110a of the dust collecting case 110 may form a dirt collecting room for collecting dirt separated by the first cyclone 121.

The upper plate 143 blocking the upper part of the porous member 133 may be mounted on the upper end of the plurality of second cyclones 122. The upper plate 143 may block the space between the plurality of second cyclones 122 so that the middle chamber 125 in which the plurality of second cyclones 122 are mounted may not be connected to the outside.

Therefore, the space surrounded by the porous member 133, the upper plate 143, and the bottom plate 145 may form the middle chamber 125 in which a plurality of second cyclones 122 are mounted.

The discharge cover 180 that functions as a path of air discharged from the plurality of second cyclones 122 and fixes the dust collecting apparatus 100 to the cleaner may be provided on the upper side of the plurality of second cyclones 122.

The discharge cover 180 may be coupled to the upper side of the dust collecting case 110 to open and close the dust outlet 119. The discharge cover 180 may be horizontally rotated to the dust collecting case 110 to be coupled to the dust collecting case 110. The discharge cover 180 may rotate based on the central axis of the dust collecting case 110 to open and close the dust outlet 119.

The discharge cover 180 may be rotated and moved linearly with the cyclone member 120 in combination with the cyclone member 120. As the discharge cover 180 moves in the vertical direction while rotating, the dust outlet may be opened and closed. The discharge cover 180 may be detachably disposed on the upper part of the dust collecting case 110.

The fixing member 190 for fixing the discharge cover 180 to be coupled to the dust collecting case 110 may include a first fixing member 191, a second fixing member 192, and an elastic member 193.

The first fixing member 191 may be provided on one side of the discharge cover 180, and the second fixing member 192 may be provided in a position corresponding to the first fixing member 191 in the dust collecting case 110. The first fixing member 191 may be elastically coupled to the second fixing member 192 by the elastic member 193. The first fixing member 191 and the second fixing member 192 may be coupled to each other so that the discharge cover 180 may be fixedly coupled to the dust collecting case 110.

The sealing member 160 may seal the discharge cover 180 and the dust collecting case 110 to prevent the dust in the dust collecting apparatus 100 from being discharged to the outside, and maintain the pressure in the dust collecting apparatus 100.

The discharge cover 180 may be horizontally rotated to the dust collecting case 110 in combination with the dust collecting case 110, and form a space between the sealing member 160 and the dust collecting case 110.

The operation of the dust collecting apparatus having the above-described structure according to an embodiment will be described in detail.

Dirt containing air may flow into the first cyclone 121 through the inlet 111 (arrow A). While the dirt containing air flowing into the inlet 111 swirls in the first cyclone 121, the dirt may be separated by the centrifugal force. By the centrifugal force, the dirt and dust contained in the polluted air may be separated and dropped onto the bottom 110a of the dust collecting case 110 to be collected.

The dirt free air may flow into the middle chamber 125 through the porous member 133 (arrow B).

Air flowing into the middle chamber 125 may flow into the cyclones 141 for forming the plurality of second cyclones 122 inside through the plurality of air inlets 141a of the plurality of second cyclones 122 (arrow C).

Fine dust may be separated from the air flowing into the second cyclones 122 due to the centrifugal force applied to the air circulating inside. The separated fine dust may drop along the cyclones 141 down to the dust collecting room 151 of the dust separation member 150 through the dust outlet 142.

The fine dust free air in the plurality of second cyclones 122 may be discharged to the filter member 135 through the air outlet 141b of each of the plurality of second cyclones 122 (arrow D).

The air discharged to the filter member 135 may be discharged to the outside of the dust collecting apparatus 200 through the outlet 181 of the discharge cover 180 (arrow E).

The process in which the discharge cover 180 is unlocked from the dust collecting case 110 will be described below.

Figure 4A:
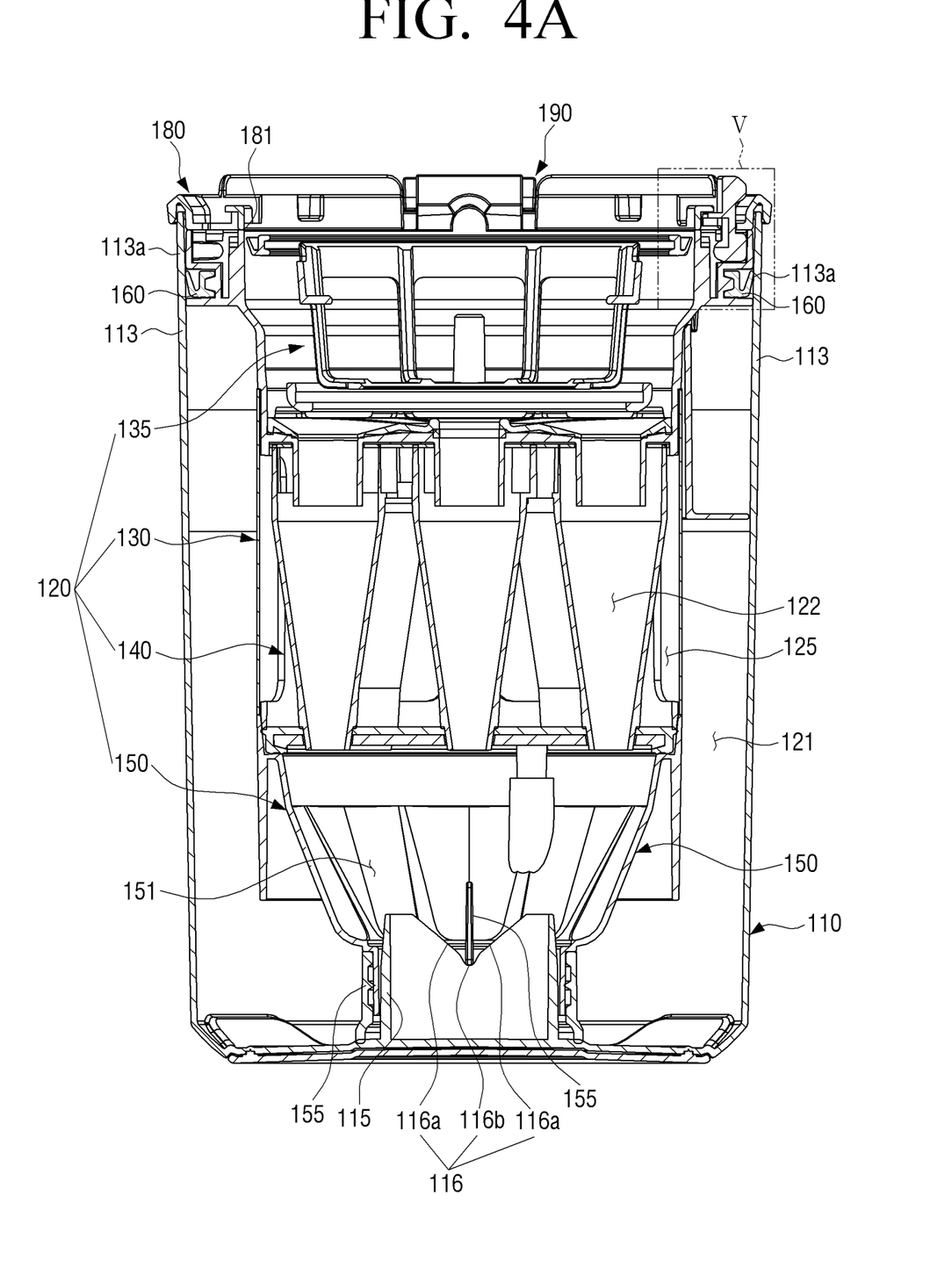
FIG. 4A is a cross-sectional view illustrating a state in which a discharge cover and a cyclone member are locked to a dust collecting case in a dust collecting apparatus according to an embodiment.

FIG. 4A is a cross-sectional view illustrating a state in which a discharge cover and a cyclone member are locked to a dust collecting case in a dust collecting apparatus according to an embodiment.

FIG. 4A is a cross-sectional view illustrating a state in which a discharge cover and a cyclone member are locked to a dust collecting case in a dust collecting apparatus according to an embodiment.

Referring to FIG. 4A, when the discharge cover 180 is locked to the dust collecting case 110, the sealing member 160 may be positioned such that the discharge cover 180 blocks the dust outlet 119 and seals between the dust collecting case 110 and the discharge cover 180.

The sealing member 160 may be sealed in surface contact with the outer wall 113 of the dust collecting case 110.

When the discharge cover 180 is locked to the dust collecting case 110, the cyclone member 120 may be coupled to the dust collecting case 110. The guide member 115 formed in the dust collecting case 110 may be inserted into the dust separation member 150 of the cyclone member 120. The guide protrusion 155 may be inserted into the guide groove 116, or mounted on the trapping part 116b.

A locking state between the discharge cover 180 and the dust collecting case 110 may be maintained by coupling the first fixing member 191 formed in the discharge cover to the second fixing member 192 formed in the dust collecting case 110.

Figure 4B:
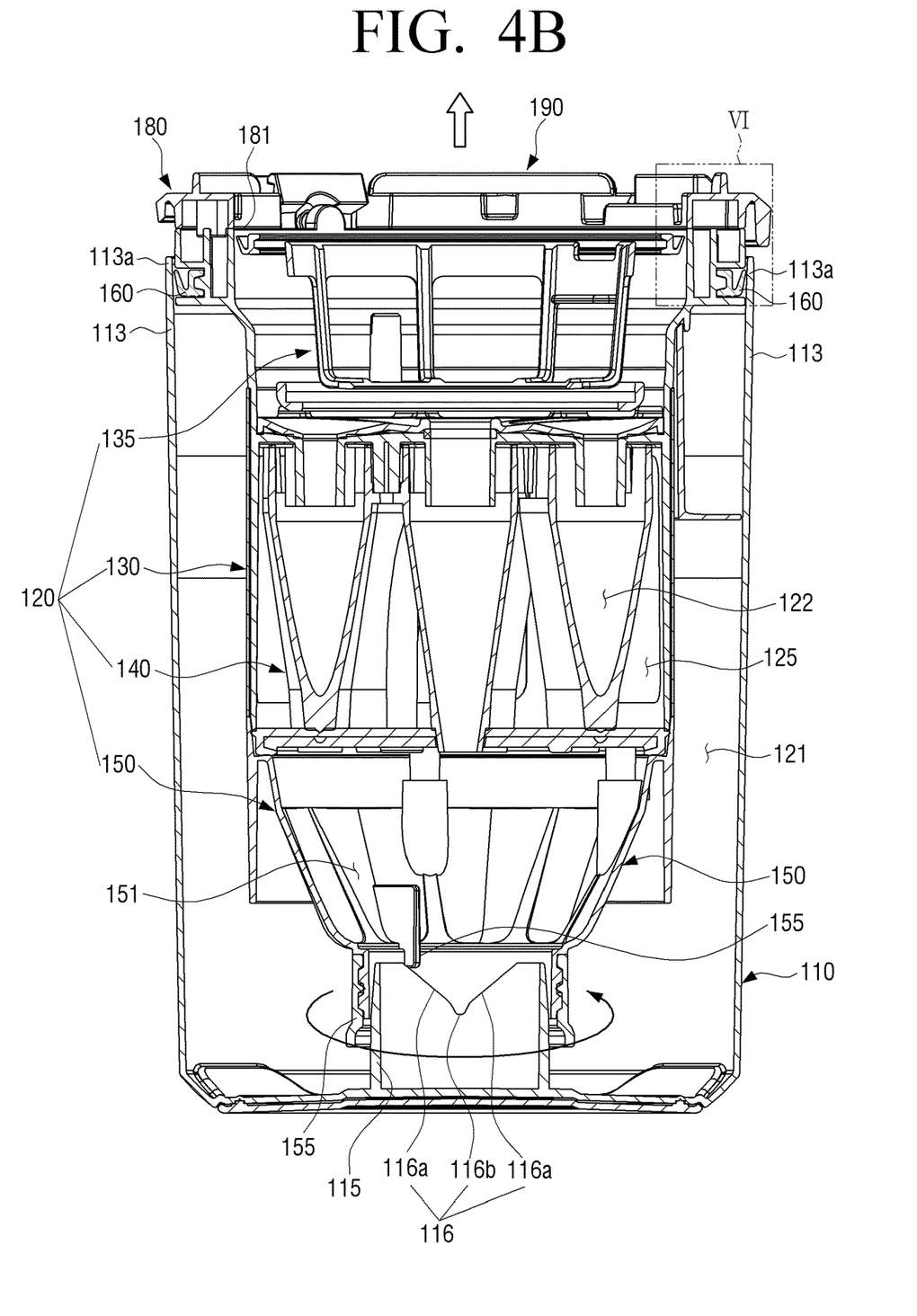
FIG. 4B is a cross-sectional view illustrating a state in which a discharge cover and a cyclone member are unlocked from a dust collecting case in a dust collecting apparatus according to an embodiment.

FIG. 4B is a cross-sectional view illustrating a state in which a discharge cover and a cyclone member are unlocked from a dust collecting case in a dust collecting apparatus according to an embodiment.

Referring to FIG. 4B, when a user horizontally rotates the discharge cover 180 to open the dust outlet 119 for removing the dust collected in the dust collecting case 110, the discharge cover 180 may move to be spaced apart from the dust collecting case 110.

While the discharge cover 180 rotates and moves up, the cyclone member 120 may move up together, and the locking between the dust collecting case 110 and the discharge cover 180 may be released to separate the cyclone member 120.

When the discharge cover 180 rotates clockwise or counterclockwise, the cyclone member 120 may rotate together with discharge cover 180. When the cyclone member 120 rotates, the guide protrusion 155 disposed under the cyclone member 120 may rotate together. The guide protrusion 155 may move along the inclination part 116a while being inserted into the guide groove 116 of the guide member 115. As the guide protrusion 155 moves to be spaced apart from the dust collecting case 110 with the guidance of the inclination part 116a, the cyclone member 120 may move upwardly with respect to the dust collecting case 110.

The cyclone member 120 may move to be spaced apart from the dust collecting case 110 together with the discharge cover 180 through the guide member 115 and the guide protrusion 155 and be unlocked from the dust collecting case 110.

The sealing member 160 may be spaced apart from the outer wall 113 of the dust collecting case 110 at a predetermined interval.

As the discharge cover 180 rotates about the central axis, the sealing member 160 that rotates together with the discharge cover 180 may be rotated and moved while contacting part of the outer wall 113 of the dust collecting case 110.

As the sealing member 160 rotates and moves upwardly, the sealing member 160 and the dust collecting case 110 may be spaced apart from each other, and thus the inner pressure and the external pressure of the dust collecting apparatus 100 may be balanced. The discharge cover 180 may be easily separated from the dust collecting case 110 because the inner pressure and the external pressure of the dust collecting case 1100 are balanced. Therefore, the dust collected in the dust collecting case 110 can be prevented from being scattered when the discharge cover 180 is opened.

Figure 4C:
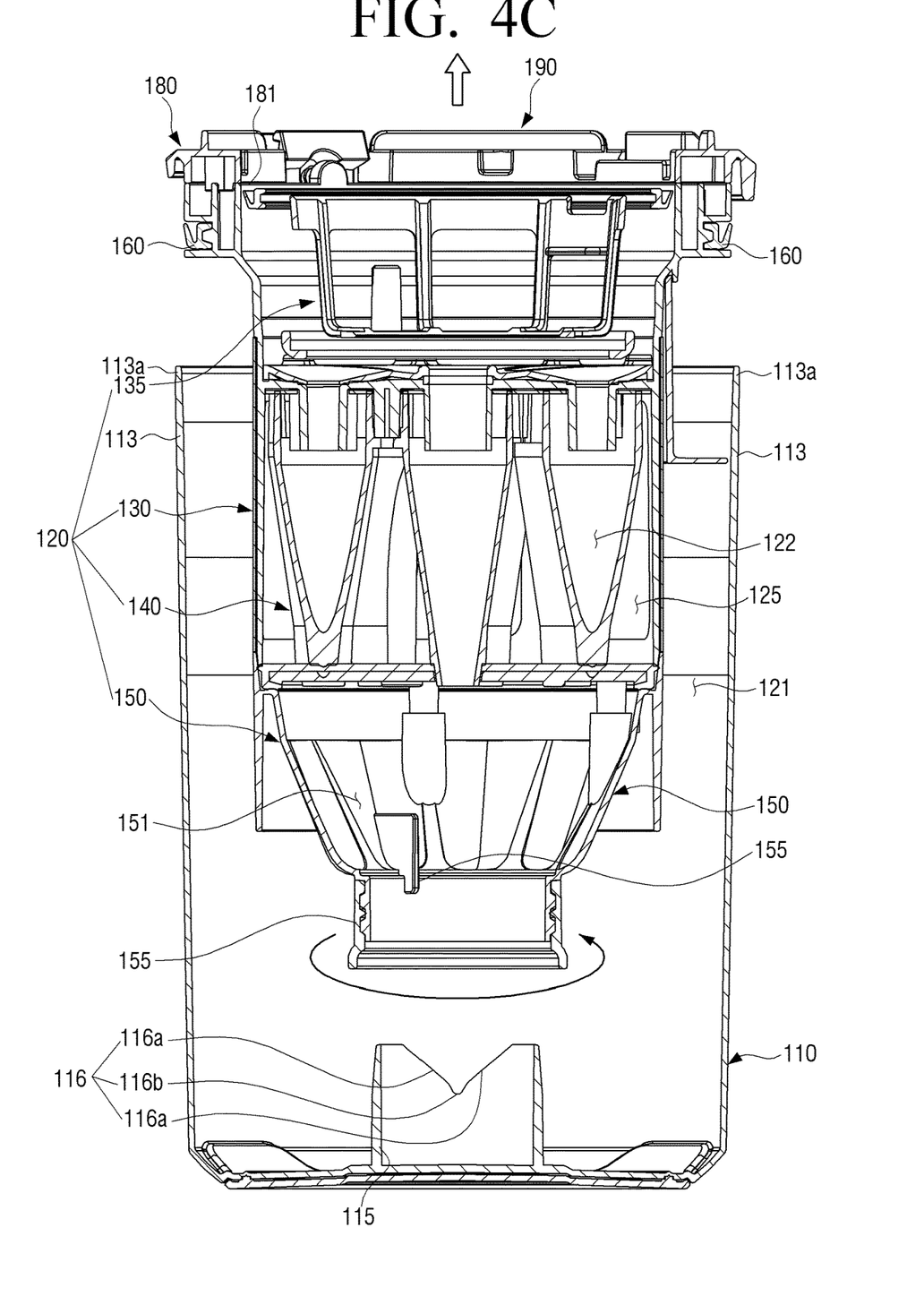
FIG. 4C is a cross-sectional view illustrating a state in which a discharge cover and a cyclone member are separated from a dust collecting case in a dust collecting apparatus according to an embodiment.

FIG. 4C is a cross-sectional view illustrating a state in which a discharge cover and a cyclone member are separated from a dust collecting case in a dust collecting apparatus according to an embodiment.

Referring to FIG. 4C, when the discharge cover 180 rotates at a predetermined angle, the cyclone member 120 and the sealing member 160 rotate together and move upwardly to be separated from the dust collecting case 110. The discharge cover 180 and the cyclone member 120 may be moved to the outside of the dust collecting case 110. The dust collecting case 110 separated from the cyclone member 120 may discharge separated dust to the outside through the dust outlet 119.

After the separated dust is discharged to the outside, the user may mount the cyclone member 120 in the dust collecting case 110 and horizontally rotate the discharge cover 180 to close the dust outlet 119.

When the discharge cover 180 moves downwardly while rotating, the cyclone member 120 may move toward the dust collecting case 110. The dust collecting case 110 and the discharge cover 180 may be locked so that the cyclone member 120 may not be separated as shown in FIG. 4A.

Figure 5A:
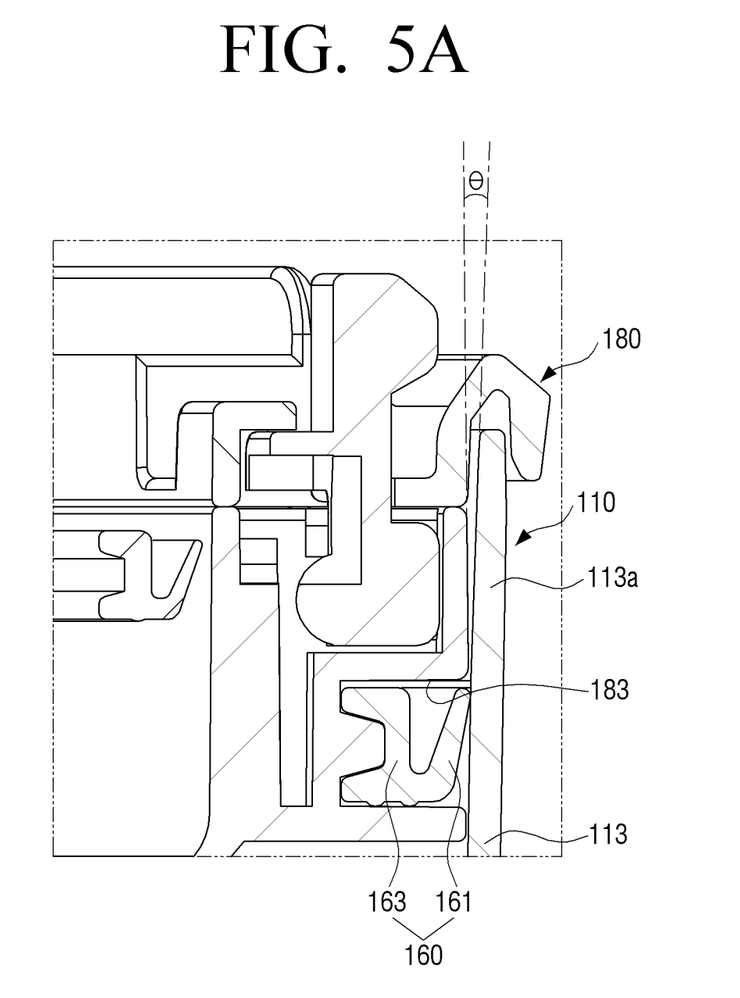
FIG. 5A is an enlarged view illustrating part V shown in FIG. 4B.
Figure 5B:
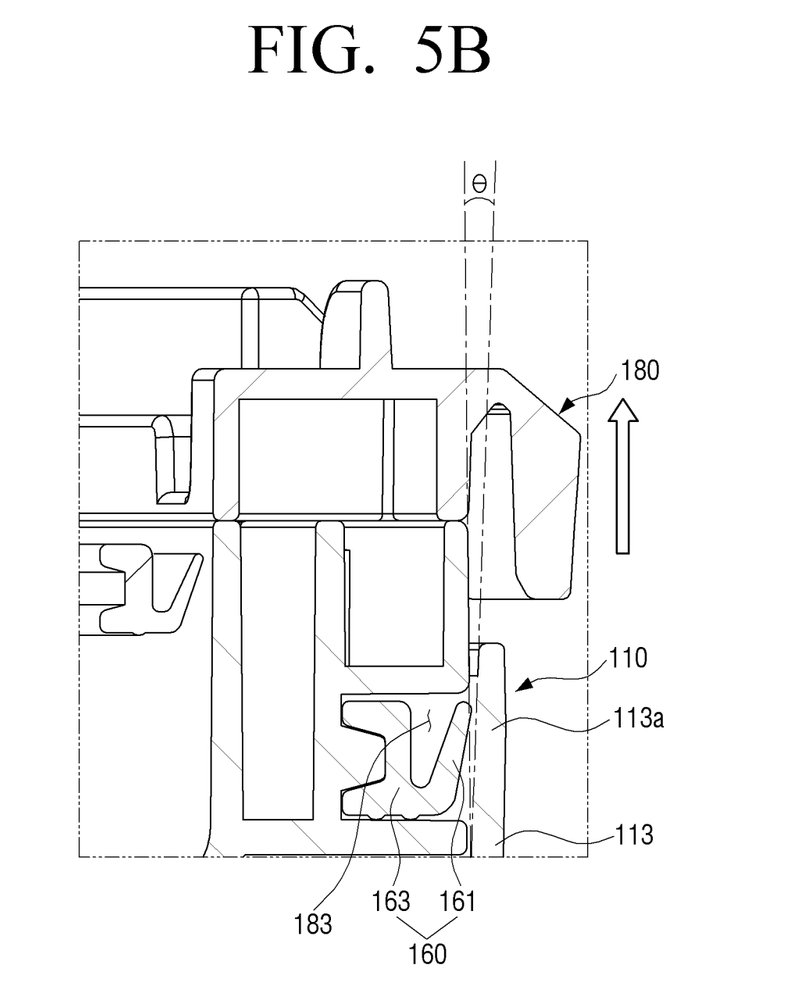
FIG. 5B is an enlarged view illustrating part V1 shown in FIG. 4B.

FIG. 5A is an enlarged view illustrating part V shown in FIG. 4B, and FIG. 5B is an enlarged view illustrating part V1 shown in FIG. 4B.

Referring to FIG. 5A and FIG. 5B, the sealing member 160 may include a sealing part 161 and a connecting part 163.

When the discharge cover 180 and the dust collecting case 110 are closed, the sealing member 160 may be in contact with the outer wall 113 of the dust collecting case 110, and the space between the dust collecting case 110 and the discharge cover 180 may be sealed. The sealing member 160 may be mounted along the face where the dust collecting case 110 and the discharge cover 180 face each other.

The connection part 163 may be inserted into the sealing groove 183 formed on the discharge cover 180 and fixed to the discharge cover 180 so that the sealing member 160 may not be deviated from the discharge cover 180.

The sealing part 161 may extend from the connecting part 163. The sealing part 161 may contact the outer wall 113 of the dust collecting case 110 forming the dust outlet 119 to seal. The sealing part 161 may be differently positioned as the dust outlet 119 is opened and closed by the discharge cover 180.

The sealing part 161 may include an elastic material. When an external force is applied to the sealing part 161, its position may move, and when the external force is removed, the sealing part 161 may return to its original position. The entire sealing member 160 including the sealing part 161 may be formed of a material having elasticity.

The dust collecting case 110 may include an inclination wall 113*a* inclined outwardly from the outer wall 113 of the dust collecting case contacting the sealing member 160 when the dust outlet 119 is closed.

The inclination wall 113*a* may be formed on the upper side of the dust collecting case 110, and inclined outwardly to an outer radius at a predetermined angle (θ) with respect to the outer wall 113 extending from the bottom 110*a* of the dust collecting case 110.

When the discharge cover 180 rotates and moves upwardly, the sealing member 160 may move upwardly together. The sealing member 160 may contact the inclination wall 113*a* of the outer wall of the dust collecting case 110 so that the inclination wall 113*a* and the sealing member 160 may be spaced apart from each other due to the rise of the sealing member 160.

When the discharge cover 180 horizontally rotate to the dust collecting case 110 in combination therewith, the space may be formed between the sealing member 160 and dust collecting case 110. As the space is formed, the inner pressure and the external pressure in the dust collecting apparatus 100 may be balanced, so that it becomes easy to open and close the discharge cover 180. The dust collected in the dust collecting case 110 may be prevented from being scattered due to the pressure difference.

The process in which the sealing member 160 is not sealed between the discharge cover 180 and the dust collecting case 110 swill be described below.

Referring to FIG. 5A, when the discharge cover 180 is coupled to the dust collecting case 110, the sealing member 160 may be provide in the first position. The first position may be a position where the sealing member 160 is sealed in contact with the outer wall of the dust collecting case 110. The sealing member 160 in the first position may mean that the external force is applied to the sealing member 160, and the sealing member 160 is inwardly moved from its original position.

The sealing member 160 may be positioned to contact the outer wall 113 of the dust collecting case 110 in the first position. The sealing member 160 may be elastic to have a restoration force toward the outer wall 113 of the dust collecting case. The sealing member 160 may be coupled to the outer wall 113 of the dust collecting case 110 strongly due to the restoration force.

Referring to FIG. 5B, the sealing member 160 may be provided to the second position when the discharge cover 180 is separated from the dust collecting case 110. The second position may be a position in which an external force is not applied to the sealing member 160.

As the discharge cover 180 is separated from the dust collecting case 110, the sealing member 160 may move upwardly with respect to the dust collecting case 110. When the sealing member 160 moves to the position corresponding to the inclination wall 113*a*, an external force may not be applied to the sealing member 160 by the inclination wall 113*a* inclined in the outward direction. The sealing member 160 may be spaced apart from the inclination wall 113*a* at a predetermined interval.

The sealing may be released as the sealing member 160 and the inclination wall 113*a* are spaced apart from each other. Accordingly, the discharge cover 180 may be easily unlocked from the dust collecting case 110.

The space may be formed between the sealing member 160 and the dust collecting case 110 by the upward movement of the discharge cover 180 in accordance with the rotation of the discharge cover 180 at predetermined interval, and due to such space, the internal pressure and the external pressure of the dust collecting apparatus 100 may be balanced to easily open and close the dust outlet 119.

The shape of sealing member 160 may be changed due to the combination of the dust collecting case 110 and the discharge cover 180 and the sealing member 160 may be in surface contact with the outer wall 113 of the dust collecting case 110. When the dust outlet 119 is closed, and the discharge cover 180 is rotated and moved upwardly to open the dust outlet 119, the space may be formed between the dust collecting case 110 and the sealing member 160 by the inclination wall 13*a* of the dust collecting case 110. Accordingly, the locking between the dust collecting case 110 and the discharge cover 180 may be easily released.

Figure 6:
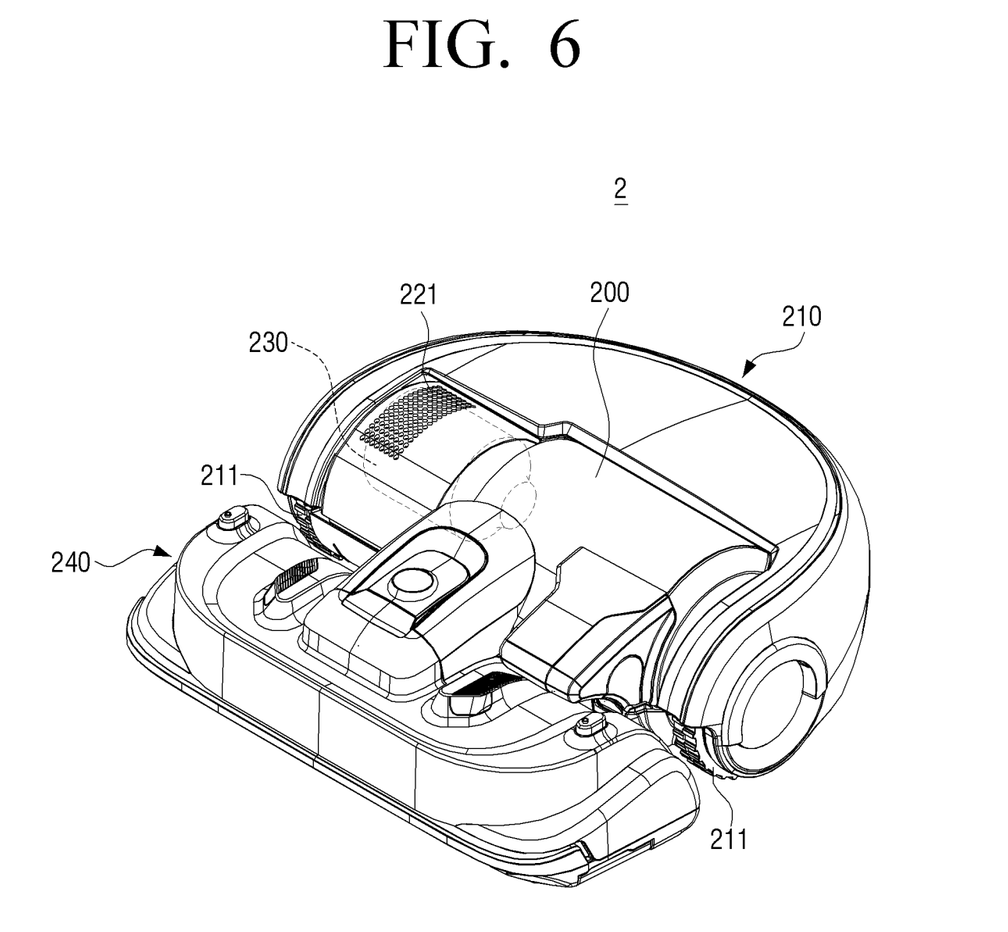
FIG. 6 is a view illustrating a robot cleaner including a dust collecting apparatus according to an embodiment.

FIG. 6 is a view illustrating a robot cleaner including a dust collecting apparatus according to an embodiment.

Referring to FIG. 6, a robot cleaner 2 according to an embodiment may include a cleaner body 210 and a suction nozzle 240.

The cleaner body 210 may include a dust collecting apparatus 200 for collecting inhaled dirt and a suction motor 230 for generating a suction force to suction the dirt. In addition, the cleaner body 210 may include a plurality of wheels 211 for moving the robot cleaner 2, a driver (not shown) for driving the plurality of wheels, and a location detection sensor (not shown) for recognize the location of the robot cleaner 2, and a controller (not shown) for controlling the driver and the suction motor 230.

The dust collecting apparatus 200 may separate dirt from air including the dirt suctioned by the suction force generated by the suction motor 230 to collect, and discharge dirt free air to the suction motor 230 through an outlet. The dust collecting apparatus 200 may include a guide member 115 (see FIG. 2) and a guide protrusion 155 (see FIG. 2). Accordingly, the discharge cover 180 (see FIG. 2) may horizontally rotate in combination with the dust collecting case 110 (see FIG. 2) to form the space between the sealing member 160 (see FIG. 2) and the dust collecting case 110, so that the locking between the discharge cover 180 and the dust collecting case 110 may be easily released.

The suction nozzle 240 may be connected to the inlet 111 (see FIG. 2) of the dust collecting apparatus 100. The suction nozzle 240 may be mounted to be rotatable with respect to the cleaner body 210.

The suction motor 230 may be connected to the dust collecting apparatus 200 to generate a suction force to allow air to be suctioned into the dust collecting apparatus 200 with dirt.

When the suction motor 230 of the robot cleaner 2 is turned on, the suction force may be generated by the suction motor 230, and the dirt and dust on the cleaning surface may be suctioned through the suction nozzle 240 to be separated by the dust collecting apparatus 200 to collect. The dirt free air may be discharged from the dust collecting apparatus 200, and discharged to the outside of the cleaner body 210 through an outlet 221 of the cleaner body 210 via the suction motor 230.

The disclosure has been described above in an illustrative manner. The terms used herein are for the purpose of description and should not be construed as limiting. Various modifications and variations of the disclosure are possible in light of the above description. Accordingly, the disclosure may be freely practiced within the scope of the claims, unless otherwise specified.

What is claimed is:

1. A dust collecting apparatus, comprising: a dust collecting case including a dust outlet to discharge collected dust; a cyclone member configured to rotate and move linearly in the dust collecting case to be detachable from and attachable to the dust collecting case; a discharge cover configured to rotate and move linearly together with the cyclone member to detach from and attach to an upper part of the dust collecting case to open and close the dust outlet; and a sealing member having elasticity and disposed between the dust collecting case and the discharge cover, wherein the discharge cover rotates along a horizontal direction of the dust collecting case to detach from the upper part of the dust collecting case and form a space between the sealing member and the dust collecting case.

2. The apparatus as claimed in claim 1, wherein the cyclone member rotates with respect to the dust collecting case together with the discharge cover and moves in a vertical direction as the discharge cover rotates in the horizontal direction of the dust collecting case.

3. The apparatus as claimed in claim 2, wherein the dust collecting case and the discharge cover are locked to each other not to separate the cyclone member based on the cyclone member moving down due to a downward rotation of the discharge cover, and
wherein the dust collecting case and the discharge cover are unlocked to separate the cyclone member based on the cyclone member moving up due to an upward rotation of the discharge cover.

4. The apparatus as claimed in claim 1, further comprising a guide member and a guide protrusion to couple the cyclone member to the dust collecting case by rotation inside the dust collecting case,
wherein the guide member protrudes from a bottom surface of the dust collecting case, and
wherein the guide protrusion is formed at a bottom of the cyclone member to be mounted on the guide member.

5. The apparatus as claimed in claim 4, wherein the guide member includes a guide groove including an inclination part downwardly inclined from an upper end of the guide member, and a trapping part downwardly concaved from the inclination part.

6. The apparatus as claimed in claim 5, wherein the discharge cover is locked to the dust collecting case based on the guide protrusion being mounted on the trapping part, and unlocked from the dust collecting case based on the guide protrusion rotating along the inclination part.

7. The apparatus as claimed in claim 5, wherein the inclination part is symmetrically formed with respect to the trapping part.

8. The apparatus as claimed in claim 4, wherein the cyclone member further comprises a dust separation member including an inner space, and into which the guide member is inserted to a lower part.

9. The apparatus as claimed in claim 4, wherein the guide protrusion protrudes from an inner side surface of the inner space of the dust separation member.

10. The apparatus as claimed in claim 1, wherein the dust collecting case includes an outer wall contacting the sealing member, and
wherein an upper part of the outer wall includes an inclination wall inclined outwardly from the outer wall of the dust collecting case.

11. The apparatus as claimed in claim 1, wherein the discharge cover includes a first fixing member to fix the discharge cover to be coupled to the dust collecting case on one side, and
wherein the dust collecting case includes a second fixing member in a position corresponding to the first fixing member.

12. A cleaner, comprising: a suction nozzle; a dust collecting apparatus connected to the suction nozzle; and a suction motor connected to the dust collecting apparatus to generate a suction force, wherein the dust collecting apparatus comprises: a dust collecting case including a dust outlet to discharge collected dust; a cyclone member configured to rotate and move linearly in the dust collecting case to be detachable from and attachable to the dust collecting case; a discharge cover configured to rotate and move linearly together with the cyclone member to detach from and attach to an upper part of the dust collecting case to open and close the dust outlet; and a sealing member having elasticity and disposed between the dust collecting case and the discharge cover, wherein the discharge cover rotates along a horizontal direction of the dust collecting case to detach from the upper part of the dust collecting case and form a space between the sealing member and the collecting case.

13. The cleaner as claimed in claim 12, wherein the cyclone member rotates with respect to the dust collecting case together with the discharge cover and moves in a vertical direction as the discharge cover rotates in the horizontal direction of the dust collecting case.

14. The cleaner as claimed in claim 13, wherein the dust collecting case and the discharge cover are locked to each other not to separate the cyclone member based on the cyclone member moving down due to a downward rotation of the discharge cover, and
wherein the dust collecting case and the discharge cover are unlocked to separate the cyclone member based on the cyclone member moving up due to an upward rotation of the discharge cover.

15. The cleaner as claimed in claim 12, wherein the cleaner is a wireless stick cleaner or a robot cleaner.

\* \* \* \* \*